May 13, 1924.

O. P. NORMAN

BELT SHIFTER

Filed Nov. 22, 1923

1,493,822

2 Sheets-Sheet 1

INVENTOR.
Orville P. Norman
BY Nestall and Wallace
ATTORNEYS

May 13, 1924.

O. P. NORMAN

BELT SHIFTER

Filed Nov. 22, 1923

1,493,822

2 Sheets-Sheet 2

INVENTOR.
Orville P. Norman
BY Westall and Wallace
ATTORNEYS

Patented May 13, 1924.

1,493,822

UNITED STATES PATENT OFFICE.

ORVILLE P. NORMAN, OF LOS ANGELES, CALIFORNIA.

BELT SHIFTER.

Application filed November 22, 1923. Serial No. 676,312.

*To all whom it may concern:*

Be it known that I, ORVILLE P. NORMAN, a citizen of the United States, and resident of Los Angeles, in the county of Los Angeles and State of California, have invented new and useful Improvements in a Belt Shifter, of which the following is a specification.

This invention relates to a belt shifter particularly designed for use with cone or stepped pulleys, whereby to change the speed of the driven member. The primary object of this invention is to provide a device of the character described, which is simple, inexpensive in construction, positive in operation, and particularly adapted for pulleys operating at a high speed. In addition to the broader objects of this invention there are certain details of structure whereby a structural form which is not cumbersome, will not interfere with the other parts of a machine, is easy to manipulate and is economical to manufacture may be obtained.

Figure 1:
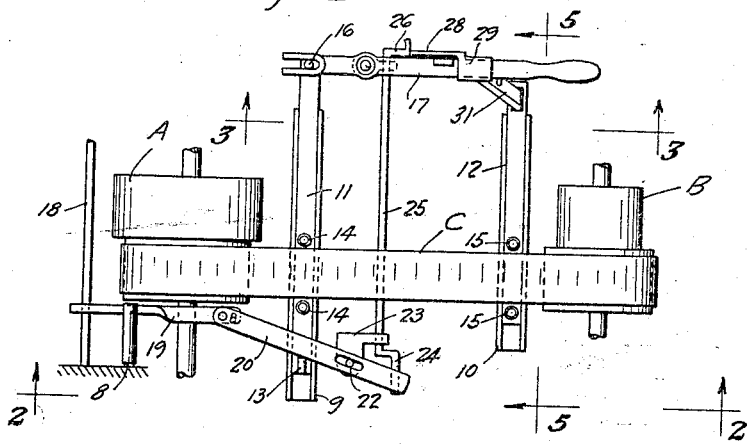
Figure 2:
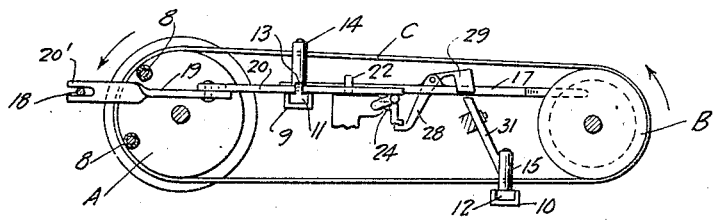
Figure 3:
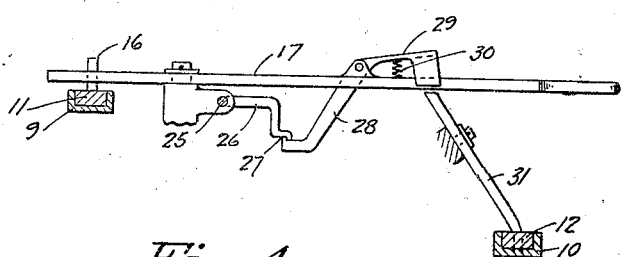
Figure 4:
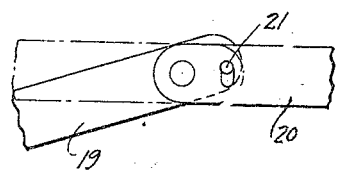
Figure 5:
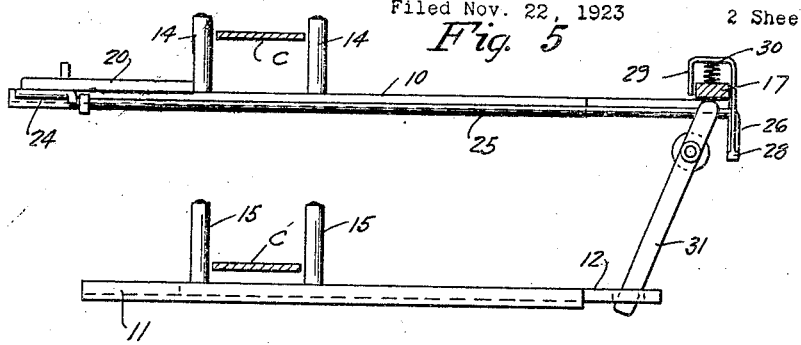
Figure 6:
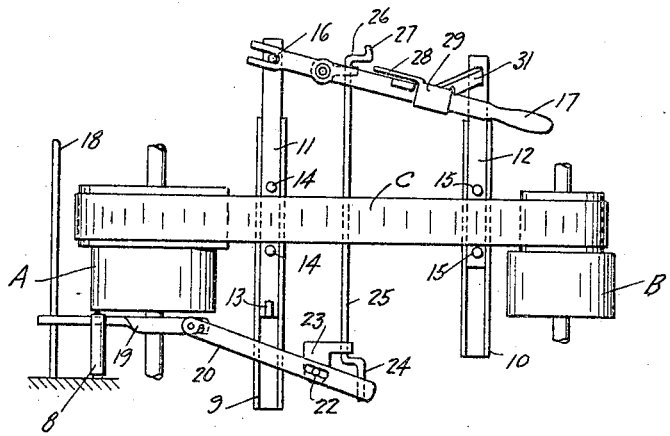
Figure 7:
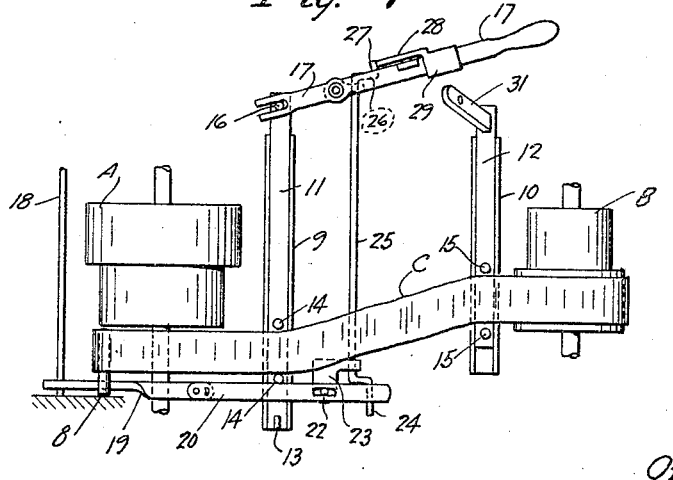

These objects together with other objects and corresponding accomplishments are obtained by means of the embodiment of my invention illustrated in the accompanying drawing, in which:

Fig. 1 is a plan view of my improved belt shifter applied to cone pulleys; Fig. 2 is a side elevation; Fig. 3 is a section as seen on the line 3—3 of Fig. 1; Fig. 4 is a detail view of a portion of the structure shown in Fig. 1 on an enlarged scale; Fig. 5 is a section as seen on the line 5—5 of Fig. 1; Fig. 6 is a view similar to Fig. 1 showing the belt in another position; and Fig. 7 is a view similar to Fig. 1 showing the belt in its off position.

Referring more particularly to the drawing, A indicates a driving pulley and B a driven pulley. A belt C is passed over the pulleys. Pulleys A and B are cone pulleys having two steps.

At the side of the smaller step of pulley A are rollers 8, upon which the belt C hangs when in inoperative position. Fixedly secured to some stationary part of the machine are channel bars 9 and 10 serving as guide-ways for blocks 11 and 12. It will be noted from an inspection of Fig. 2 that channel 9 is disposed just below the upper side of belt C and the channel 10 is disposed just below the lower side of the belt. Block 11 has an abutment or tooth 13 upstanding therefrom and carries pins 14 preferably provided with rollers, the pins being so arranged as to be disposed on opposite sides of the belt. Similarly block 12 carries pins 15 for engaging opposite sides of the belt. Upstanding from the end of block 11 is a pin 16. Pivotally mounted upon a stationary part of the machine is an operating lever 17, which is bifurcated at the end, with the arms of the bifurcation straddling the pin 16. Thus, by shifting the lever, block 11 will be slid in its way 9 and thereby move the belt which lies between the pins 14. Fixed to a stationary part of the machine back of the pulley A and parallel to its shaft is a rod 18. Rod 18 has slidably mounted thereon a link 19, the end thereof being bifurcated as indicated by 20′ in Fig. 2 whereby the link may pivot upon rod 18. Pivotally secured to link 19 is a link 20, there being an elongated slot in lever 19 in which a pin 21 secured to a lever 19 is mounted, see Fig. 4. By this construction an articulated arm having a limited pivotal movement between the links is provided. Link 20 has an elongated slot in which is a pivot pin 22 which is fixed to a stationary guide 23. This provides a pivotal mounting for the arm and from which it may be lifted. Disposed beneath the end of link 20 is a crank arm 24. Crank arm 24 is formed on a shaft 25 extending transverse to the belt, the other end thereof having an arm 26, best shown in Fig. 3. On the end of the arm 26 is a finger 27. Mounted upon lever 17 is a lever 28 having a thumb piece 29, there being a compression spring 30 beneath the thumb piece tending to hold the thumb piece in upper position. The other end of the lever is disposed below finger 27, when the lever is in the position shown in Figs. 1 and 7. It is obvious that in this position when the thumb piece is pressed downwardly, the end of the lever will engage the finger 27, lift the arm 26 and turn shaft 25. This causes the crank 24 to be lifted thereby raising link 20 and lifting it into a position such that tooth 13 upstanding from block 11 will clear the link.

Block 12 has articulated to one end thereof a lever 31, the latter being pivotally mounted upon a stationary part of the machine and the upper end being disposed to lie under the sides of the thumb piece, when the latter is pressed downwardly.

Suppose the parts are in the position shown in Fig. 7. In this position, the belt C at the driving end rests upon rollers 8 and at the driven end upon the larger step of pulley B. To place the belt upon the first step of the driving pulley, the handle of lever 17 is grasped and swung to the left to the position shown in Fig. 1. This moves the block 11 and with it the pins 14, thereby carrying the belt C from the rollers 8 upon the smaller step of pulley A. In the movement of block 11, tooth 13 will have engaged the link 20 and swung the link to the position shown in Fig. 1. Due to the limited movement of link 19 upon link 20, the latter will be swung toward the pulley A in a direction parallel to the belt and will push the belt onto the smaller step of pulley A. To move the belt upon the larger step of the driven pulley, thumb piece 29 is depressed. The thumb piece then engages the top of lever 31 and connects lever 17 and block 12 through its intermission. At the same time lever 28 lifts arm 26, turns shaft 25, lifting crank arm 24 and raising the link 20 so that tooth 13 on the block will clear it. The lever 17 is then swung to the position shown in Fig. 6. There will be no movement of link 20. Block 11 will be moved further to the right so that belt C will move upon the larger step of pulley A. Block 12 will also be moved to the left bringing the belt C upon the smaller step of pulley B. The thumb piece may then be released. In returning the belt to the smaller step of pulley A and the larger step of pulley B, the thumb piece should be again depressed so as to engage the lever 31 and move block 12. After the belt has been placed upon the smaller step of pulley A and the larger step of pulley B, the thumb piece may be released. To place the belt upon the rollers 8, lever 17 is pulled to the left. This moves block 11 to the left and the pins 14 push the belt over on the roller 8. The tooth 13 will slide below the link 20, lift the latter and allow it to drop behind the link in position to move the link upon first movement of the lever 17 to the left to place the belt upon the driven pulley.

What I claim is:

1. A belt shipper for cone pulleys comprising a transversely slidable belt guiding member disposed at the upper side of said driving pulley, means at the side of the driving pulley upon which the belt hangs in inoperative position, a second transversely slidable belt guiding member disposed at the under side of said belt at the driven pulley, an arm mounted at the side of said belt at said driving pulley to push said belt upon the first step of said driving pulley, operating means to slide said first mentioned belt guiding member, operating means to slide said second mentioned guiding member in the same direction, means to engage said operating means whereby to cause the same to be moved simultaneously, and means to connect and disconnect said arm to said first mentioned operating means whereby said arm and operating means may be moved simultaneously.

2. A belt shipper for cone pulleys comprising a transversely slidable belt guiding member, means at the side of the driving pulley on which said belt hangs in inoperative position, an arm mounted at the side of said belt at said driving pulley to push said belt upon the first step of said pulley, operating means to slide said member, and means to connect and disconnect said arm to said operating means whereby said arm and said member may be moved simultaneously.

3. A belt shipper for cone pulleys comprising a guide way, a belt guiding block slidably mounted in said way, rollers at the side of the driving pulley on which said belt hangs in inoperative position, a pivoted arm mounted at the side of said belt at said driving pulley to push said belt upon the first step of said pulley, operating means to slide said block, said block having an upstanding abutment disposed to engage said arm whereby to move the latter simultaneously with said operating means, and means to lift said arm out of the path of travel of said abutment whereby to disconnect said arm from said operating block.

4. A belt shipper for cone pulleys comprising a guide way, a belt guiding block slidably mounted in said way at the upper side of the driving pulley, rollers at the side of the driving pulley on which said belt hangs in inoperative position, a pivoted arm mounted at the side of said belt at said driving pulley to push said belt upon the first step of said pulley, a second guide way, a belt guiding member slidably mounted in said second guide way at the under side of said belt at the driven pulley, operating means to slide said first mentioned block, the latter having an upstanding abutment disposed to engage said arm whereby to move the latter simultaneously with said operating means, operating means to slide said second mentioned block, means to engage said operating means whereby to operate the same simultaneously, and means to lift said arm to clear said abutment whereby said arm and said operating means may be moved simultaneously.

5. A belt shipper for cone pulleys comprising a guide way, a belt guiding block slidably mounted in said way, rollers at the side of the driving pulley on which said belt hangs in inoperative position, a pivoted belt arm mounted at the side of said belt at said driving pulley to push said belt upon the first step of said pulley, an operating lever to silde said block, said block having an upstanding abutment disposed to engage said arm whereby to move the latter simultaneously with said lever, a thumb lever on said operating lever, a shaft having an arm at one end disposed beneath the end of said belt arm whereby turning of said shaft will cause said belt arm to be lifted out of the path of travel of said abutment, said shaft being provided with an arm at the opposite end arranged to be engaged and turned by said thumb lever.

6. A belt shipper for cone pulleys comprising a guide way, a belt guiding block slidably mounted in said way at the upper side of the driving pulley, rollers at the side of the driving pulley on which said belt hangs in inoperative position, a pivoted arm mounted at the side of said belt at said driving pulley to push said belt upon the first step of said pulley, a second guide way, a belt guiding member slidably mounted in said second guide way at the under side of said belt at the driven pulley, an operating lever to slide said first mentioned block, the latter having an upstanding abutment disposed to engage said arm whereby to move the latter simultaneously with said operating means, operating means to slide said second mentioned block, a thumb lever on said operating lever arranged by its depression to engage said operating means whereby to operate the same simultaneously, a shaft having an arm at one end disposed beneath the end of said belt arm so as to be lifted out of the path of travel of said abutment, said shaft being provided with an arm at the opposite end arranged to be engaged and turned by said thumb lever.

In witness that I claim the foregoing I have hereunto subscribed my name this 15 day of November, 1923.

ORVILLE P. NORMAN.